US007957558B2

(12) United States Patent
Lim et al.

(10) Patent No.: US 7,957,558 B2
(45) Date of Patent: Jun. 7, 2011

(54) SYSTEM AND METHOD FOR OPTICALLY TRACKING A MOBILE DEVICE

(75) Inventors: Teng Hun Lim, Gelugor (MY); Meng Whui Tan, Bayan Lepas (MY); Yik Leong Chong, Bayna Lepas (MY); Kuldeep Kumar Saxena, Singapore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 837 days.

(21) Appl. No.: 11/961,856

(22) Filed: Dec. 20, 2007

(65) Prior Publication Data

US 2010/0266158 A1  Oct. 21, 2010

(51) Int. Cl.
*G06K 9/00* (2006.01)
(52) U.S. Cl. ........ 382/103; 382/106; 382/151; 345/179; 700/245; 701/2; 701/23
(58) Field of Classification Search .......... 382/103, 382/106, 107, 108, 113, 140, 168, 175–180, 382/232, 255, 201, 276, 286–298, 312–321; 345/179, 166, 156, 180; 348/94, 47; 701/2, 701/23, 31; 700/245; 367/127
See application file for complete search history.

(56) References Cited

U.S. PATENT DOCUMENTS

| | | | | |
|---|---|---|---|---|
| 5,812,267 A * | 9/1998 | Everett et al. | ................. | 356/614 |
| 7,065,258 B2 * | 6/2006 | Nahum | ........................ | 382/278 |
| 7,171,285 B2 * | 1/2007 | Kim et al. | ...................... | 700/245 |
| 7,511,825 B2 * | 3/2009 | Itagaki | ........................... | 356/498 |
| 7,525,082 B2 * | 4/2009 | Itagaki | ........................ | 250/221 |
| 7,655,897 B2 * | 2/2010 | Lim et al. | ...................... | 250/221 |
| 7,826,641 B2 * | 11/2010 | Mandella et al. | ............. | 382/106 |
| 2007/0262243 A1 * | 11/2007 | cheah et al. | ............... | 250/214 R |
| 2007/0291272 A1 * | 12/2007 | Itagaki | ........................ | 356/450 |

OTHER PUBLICATIONS

Sooyong Lee, "Mobile Robot Localization uisng Optical Mice", Proceedings of the 2004 IEEE Conference on Robotics, Automation and Mechatronics, Singapore, Dec. 1-3, 2004, pp. 1192-1197.
Andrea Bonarini, Matteo Matteucci and Marcello Restelli, "A Kinematic-independent Dead-reckoning Sensor for Indoor Mobile Robotics", Proceedings of 2004 IEEE/RSJ International Conference on Intelligent Robots and Systems, Sep. 28-Oct. 2, 2004, Sendai, Japan, pp. 3750-3755.

* cited by examiner

*Primary Examiner* — Daniel G Mariam
*Assistant Examiner* — Nancy Bitar

(57) ABSTRACT

A system and method for optically tracking a mobile device uses a first displacement value along a first direction and a second displacement value along a second direction, which are produced using frames of image data of a navigation surface, to compute first and second tracking values that indicate the current position of the mobile device. The first tracking value is computed using the second displacement value and the sine of a tracking angle value, while the second tracking value is computed using the second displacement value and the cosine of the tracking angle value. The tracking angle value is an angle value derived using at least one previous second displacement value.

20 Claims, 9 Drawing Sheets

SYSTEM AND METHOD FOR OPTICALLY TRACKING A MOBILE DEVICE

BACKGROUND OF THE INVENTION

Optical navigation systems detect relative movements between the optical navigation systems and navigation surfaces to perform tracking operations. An optical navigation system uses a light source to generate illumination light on a navigation surface and an image sensor to successively capture frames of image data of the navigation surface using reflected illumination light. The optical navigation system compares the successive frames of image data and estimates the relative movements between the optical navigation system and the navigation surface based on the comparison between the current frame of image data and a previous frame of image data. The optical navigation system is able to track the relative movements between the optical navigation system and the navigation surface by continuously capturing and comparing frames of image data. Optical navigation systems are commonly used in optical computer mice to track the lateral movements of the mice relative to the navigation surfaces on which the mice are manually manipulated.

Recently, there have been suggestions to use optical navigation systems in mobile robotic devices to optically track the movements of the mobile robotic devices. In the past, encoders on one or more wheels of a mobile robotic device have been used to track the movements of the mobile robotic device. However, these encoders suffer from performance issues when there is wheel slippage and when the mobile robotic device is traveling at an extremely low speed. Optical navigation systems do not suffer from these performance issues. However, conventional optical navigation systems do not work well in different environments or surfaces due to various limitations of these conventional optical navigation systems.

Thus, there is a need for a system and method for optically tracking a mobile robotic device that can work well in different environments or surfaces.

SUMMARY OF THE INVENTION

A system and method for optically tracking a mobile device uses a first displacement value along a first direction and a second displacement value along a second direction, which are produced using frames of image data of a navigation surface, to compute first and second tracking values that indicate the current position of the mobile device. The first tracking value is computed using the second displacement value and the sine of a tracking angle value, while the second tracking value is computed using the second displacement value and the cosine of the tracking angle value. The tracking angle value is an angle value derived using at least one previous second displacement value.

A system for optically tracking a mobile device in accordance with an embodiment of the invention comprises a light source, an image sensor array, a navigation engine and a tracking module. The light source is configured to emit illumination light toward a navigation surface. The image sensor array is positioned to receive the illumination light reflected from the navigation surface. The image sensor array is configured to generate frames of image data in response to the received illumination light. The navigation engine is operably connected to the image sensor array to receive the frames of image data. The navigation engine is configured to correlate the frames of image data to produce a first displacement value along a first direction and a second displacement value along a second direction. The tracking module is operably connected to the navigation engine to receive the first and second displacement values to compute first and second tracking values that indicate the current position of the mobile device. The tracking module is configured to compute the first tracking value using the second displacement value and the sine of a tracking angle value and to compute the second tracking value using the second displacement value and the cosine of the tracking angle value. The tracking angle value is an angle value derived using at least a previous second displacement value.

A method for optically tracking a mobile device in accordance with an embodiment of the invention comprises electronically capturing frames of image data of a navigation surface, correlating the frames of image data to produce a first displacement value along a first direction and a second displacement value along a second direction, and computing first and second tracking values that indicate the current position of the mobile device using the first and second displacement values. The first tracking value is computed using the second displacement value and the sine of a tracking angle value. The second tracking value is computed using the second displacement value and the cosine of the tracking angle value. The tracking angle value is an angle value derived using at least a previous second displacement value.

A method for optically tracking a mobile device in accordance with another embodiment of the invention comprises emitting illumination light toward a navigation surface, receiving the illumination light reflected from the navigation surface, producing frames of image data in response to the received illumination light, correlating the frames of image data to produce a first displacement value along a first direction and a second displacement value along a second direction, and computing first and second tracking values that indicate the current position of the mobile device using the first and second displacement values. The first tracking value is computed using the second displacement value and the sine of a tracking angle value. The second tracking value is computed using the second displacement value and the cosine of the tracking angle value. The tracking angle value is an angle value derived using at least a previous second displacement value.

Other aspects and advantages of the present invention will become apparent from the following detailed description, taken in conjunction with the accompanying drawings, illustrated by way of example of the principles of the invention.

DETAILED DESCRIPTION

Figure 1:
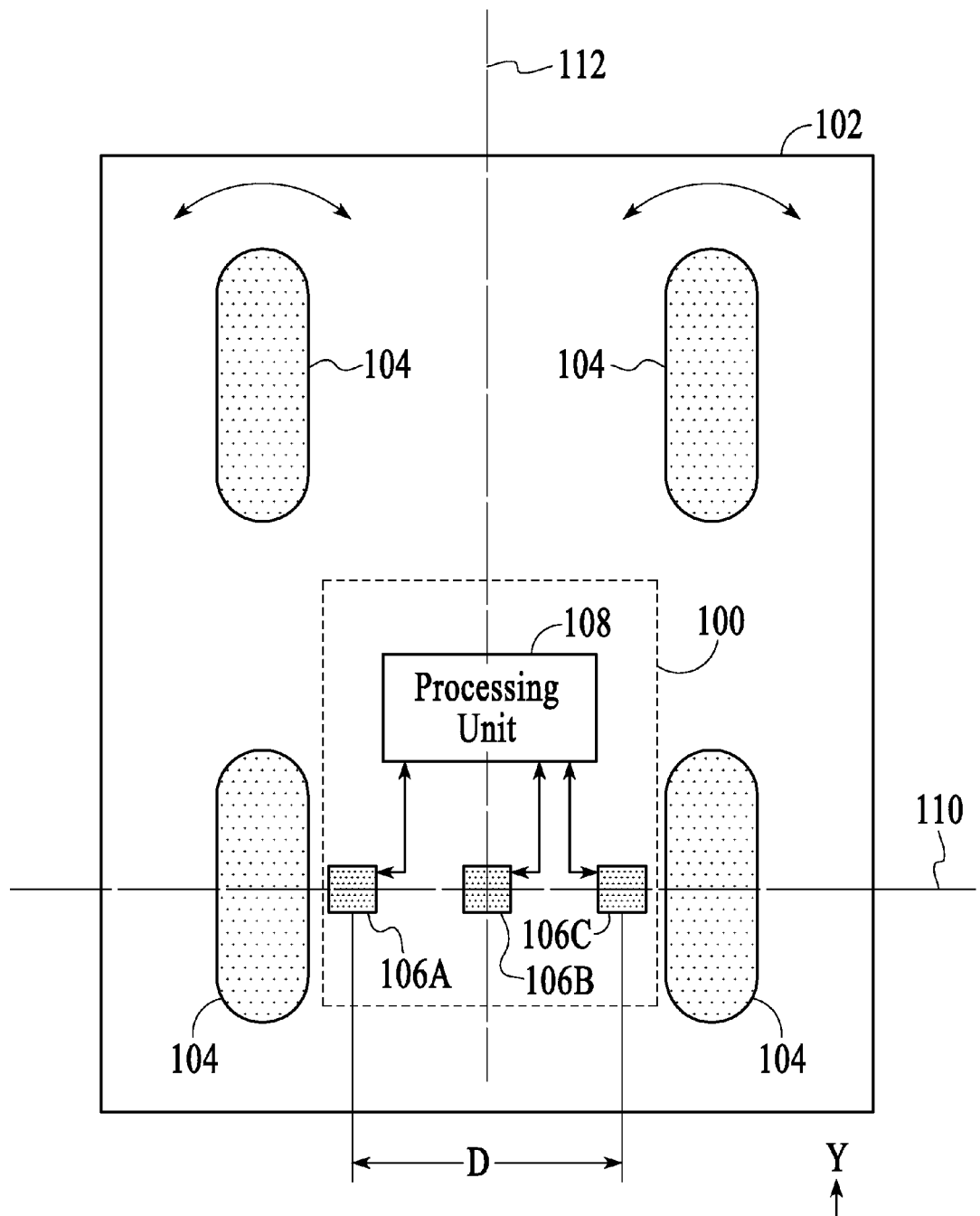
FIG. 1 is a diagram of a mobile device with an optical tracking system in accordance with an embodiment of the invention.

With reference to FIG. 1, an optical tracking system 100 in accordance with an embodiment of the invention is described. As shown in FIG. 1, the optical tracking system 100 is installed on a mobile device 102, which may be a mobile robotic device, i.e., an autonomous computer-operated device. In the illustrated embodiment, the mobile device 102 includes four wheels 104 to move the mobile device on a surface. However, in other embodiments, the mobile device 102 may include different number of wheels or may even include a different type of mechanism to move the mobile device. The optical tracking system 100 is configured to optically track the mobile device 102 using a dead-reckoning tracking process as the mobile device moves on a surface. As described in more detail below, the optical tracking system 100 is designed to operate effectively in different environments or surfaces under different conditions.

The optical tracking system 100 includes one or more optical sensor units 106A, 106B and 106C and a processing unit 108. Each of the optical sensor units 106A, 106B and 106C is configured to produce displacement data indicating displacement of the optical sensor unit with respect to a navigation surface, i.e., the surface on which the mobile device 102 is traveling. The processing unit 108 is configured to process the displacement data from one or more of the optical sensor units 106A, 106B and 106C to track the movements of the mobile device 102.

In an embodiment, the optical tracking system 100 includes only the optical sensor unit 106B. As shown in FIG. 1, the optical sensor unit 106B may be positioned at the center of the mobile device 102 along a horizontal line 110, which is parallel to the X-axis direction. In the illustrated embodiment, the horizontal line 110 is aligned with the centers of the two rear wheels 104 of the mobile device 102. However, in other embodiments, the horizontal line 110 may be situated at a different location on the mobile device 102. The displacement data from only the optical sensor unit 106B can be used to determine the movements of the mobile device 102 by the processing unit 108 of the optical tracking system 100, as described below.

In another embodiment, the optical tracking system 100 includes the two optical sensor units 106A and 106C. As shown in FIG. 1, the optical sensor units 106A and 106C may be positioned on the mobile device 102 along the horizontal line 110. In the illustrated embodiment, the optical sensor units 106A and 106C are equally spaced from a vertical line 112, which is parallel to the Y-axis direction. The vertical line 112 is situated at the center of the mobile device 102 along the X-axis direction. The optical sensor units 106A and 106C are separated from each other by a predefined distance D. Thus, the distance from the vertical line 112 and each of the optical sensor units 106A and 106C is D/2. With the positions of the optical sensor units 106A and 106C known, the displacement data from both of the optical sensor units 106A and 106C can be used to determine the movements of the mobile device 102 by the processing unit 108 of the optical tracking system 100, as described below.

Figure 2:
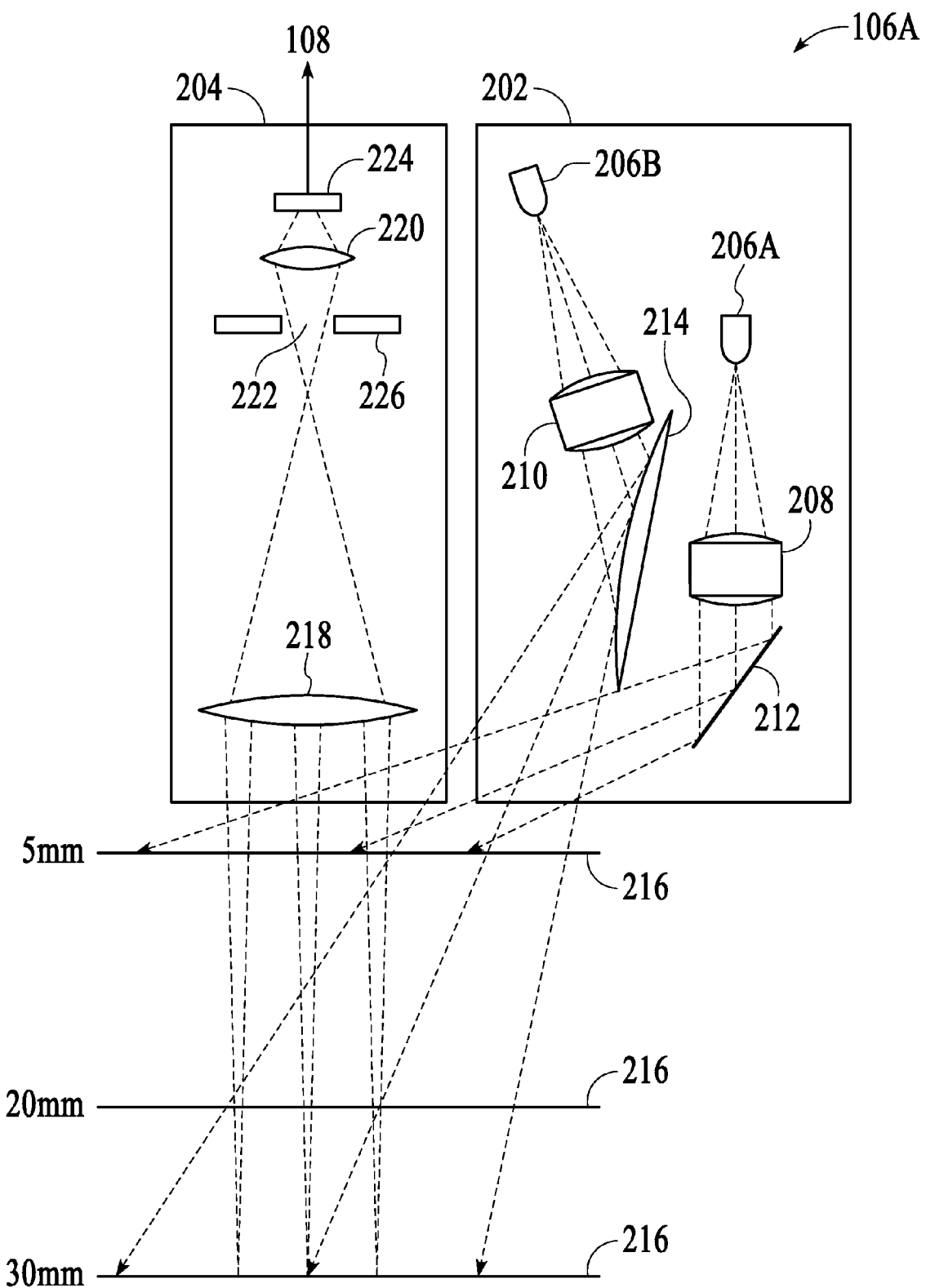
FIG. 2 is a diagram of an optical sensor unit of the optical tracking system of FIG. 1 in accordance with an embodiment of the invention.

In an embodiment, the optical sensor units 106A, 106B and 106C are identical units. Thus, only the optical sensor unit 106A is described in detail with reference to FIG. 2, which shows components of the optical sensor unit 106A. As shown in FIG. 2, the optical sensor unit 106A includes an illumination section 202 and an imaging section 204. The illumination section 202 includes light sources 206A and 206B, lenses 208 and 210 and reflectors 212 and 214, which are arranged to provide dual illumination channels. The light source 206A, the lens 208 and the reflector 212 are arranged to provide illumination light on the first illumination channel to illuminate a navigation surface 216 when the navigation surface is near the optical sensor unit 106A, e.g., when the navigation surface is 5 mm from the optical sensor unit 106A. The light source 206B, the lens 210 and the reflector 214 are arranged to provide illumination light on the second illumination channel to illuminate the navigation surface 216 when the navigation surface is further away from the optical sensor unit 106A, e.g., when the navigation surface is 20 mm to 30 mm from the optical sensor unit 106A. Using the dual illumination channels, the illumination section 202 of the optical sensor unit 106A is able to provide sufficient illumination light when the navigation surface 216 is within a wide range of distance from the optical sensor unit 106A. As an example, the illumination section 202 may be configured to provide sufficient illumination light when the navigation surface 216 is between 5 mm to 30 mm from the from the optical sensor unit 106A.

The light source 206A, the lens 208 and the reflector 212 are positioned in series toward the navigation surface 216 such that the reflector 212 is situated between the lens 208 and the navigation surface and the lens 208 is situated between the light source 206A and the reflector 212. The light source 206A is configured to generate illumination light toward the lens 208. In an embodiment, the light source 206A may be positioned to emit the illumination light along a direction normal to the navigation surface 216. The light source 206A may be a light emitting diode, a laser diode or any other light emitting device. The lens 208 is configured to optically manipulate the illumination light from the light source 206A toward the reflector 212. The lens 208 may be configured to focus and/or collimate the illumination light. The reflector 212 is configured to reflect the illumination light from the lens 208 toward the navigation surface 216 at a large angle with respect to the normal to the navigation surface so that the illumination light strikes the navigation surface at a large angle of incidence. Thus, the illumination light from the light source 206A will illuminate a region of the navigation surface 216 below the optical sensor unit 106A when the navigation surface is near the optical sensor unit. In the illustrated embodiment, the reflector 212 is a plane mirror. However, in other embodiments, the reflector 212 can be any type of a reflective element.

The light source 206B, the lens 210 and the reflector 214 are similarly positioned in series toward the navigation surface 216 such that the reflector 214 is situated between the lens 210 and the navigation surface and the lens 210 is situated between the light source 206B and the reflector 214. The light source 206B is configured to generate illumination light toward the lens 210. In an embodiment, the light source 206B may be positioned to emit the illumination light along an angled direction with respect to the normal to the navigation surface 216. The light source 206B may be a light emitting diode, a laser diode or any other light emitting device. The lens 210 is configured to optically manipulate the illumination light from the light source 206B toward the reflector 214. The lens 210 may be configured to focus and/or collimate the illumination light. The reflector 214 is configured to reflect the illumination light from the lens 210 toward the navigation surface 216 at a smaller angle with respect to the normal to the navigation surface than the illumination light from the light source 206A so that the illumination light from the light source 206B strikes the navigation surface at a smaller angle of incidence when compared to the other illumination light from the light source 206A. Thus, the illumination light from the light source 206B will illuminate a region of the navigation surface 216 below the optical sensor unit 106A when the navigation surface is further away from the optical sensor unit. In the illustrated embodiment, the reflector 214 is a convex mirror. However, in other embodiments, the reflector 214 can be any type of a reflective element.

The imaging section 204 of the optical sensor unit 106A includes imaging lenses 218 and 220, an aperture 222 and a navigation sensor 224. The first imaging lens 218 is positioned to receive the illumination light reflected from the navigation surface 216. The first imaging lens 218 is configured to focus the received light onto the second imaging lens 220. The second imaging lens 220 is configured to focus the received light onto the navigation sensor 224. The aperture 222 is situated between the first and second imaging lens 218 and 220 so that the light from the first imaging lens 218 is transmitted to the second imaging lens 220, while unwanted light from other surfaces or sources is blocked. The aperture 222 may be provided by a hole in an opaque wall or plate 226, which may be structural part of the optical tracking system 100 or the mobile device 102. In this embodiment, the imaging lenses 218 and 220, the aperture 222 and the navigation sensor 224 are aligned along a direction normal to the surface of the navigation surface 216.

In another embodiment, the components of the imaging section 204 may be arranged to receive specularly reflected light from the navigation surface 216. As an example, the imaging lenses 218 and 220, the aperture 222 and the navigation sensor 224 may be arranged to receive specular reflection at greater than 70 degrees from the navigation surface 216. In this example, the imaging lenses 218 and 220, the aperture 222 and the navigation sensor 224 are aligned along the direction of the specular reflection, and thus, are not aligned along a direction normal to the surface of the navigation surface 216.

Figure 3:
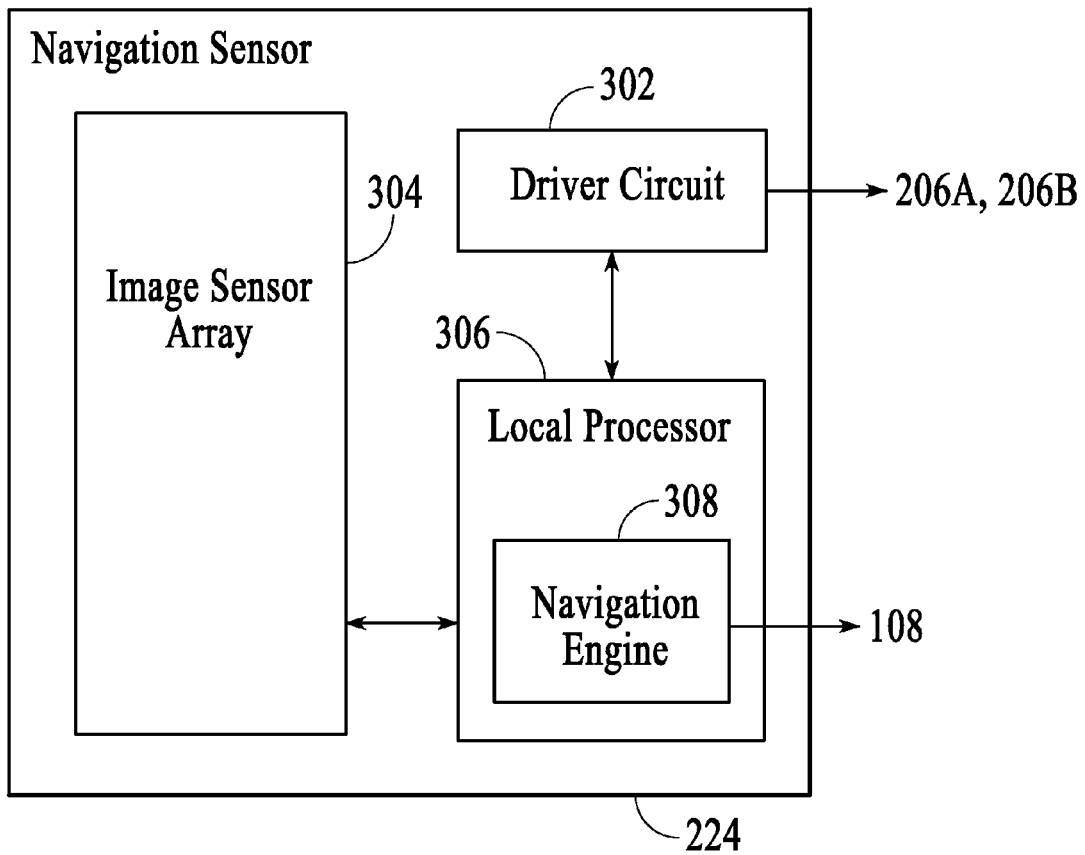
FIG. 3 is a block diagram of a navigation sensor of the optical sensor unit of FIG. 2 in accordance with an embodiment of the invention.

In an embodiment, as shown in FIG. 3, the navigation sensor 224 is an integrated circuit chip, which includes a driver circuit 302, an image sensor array 304 and a local processor 306. The navigation sensor 224 also includes supporting circuitry (not shown) for the image sensor array 304, such as an analog-to-digital converter and row and column decoders. The navigation sensor 224 may also include other elements commonly found in a conventional navigation sensor for use in an optical computer mouse.

The driver circuit 302 of the navigation sensor 224 is configured to generate driving signals for the light sources 206A and 206B. The driving signals from the driver circuit 302 are transmitted to the light sources 206A and 206B to activate the light sources to generate light, which is used to illuminate the navigation surface 216.

The image sensor array 304 of the navigation sensor 224 is an array of photosensitive pixel elements (not shown) that generate signals in response to light incident on the elements, where each signal represents the amount or intensity of light incident on a particular element of the image sensor array. These signals are referred to herein as image data. Thus, the image sensor array 304 is able to sequentially capture frames of image data in response to incident light, i.e., the illumination light reflected from the navigation surface 216 and received by the image sensor array. These frames of image data are used for correlation to estimate any relative displacement between the optical sensor unit 106A and the navigation surface 216. As an example, the image sensor array 304 may be a charge-coupled device (CCD) imaging array or a complementary metal oxide semiconductor (CMOS) imaging array. The number of photosensitive pixel elements included in the image sensor array 304 may vary. As an example, the image sensor array 304 may be a 30×30 array of photosensitive pixel elements.

The local processor 306 of the navigation sensor 224 is configured to control various components of the navigation sensor, including the driver circuit 302 and the image sensor array 304, in order to provide illumination light on the navigation surface 216 and to electronically capture frames of image data in response to the illumination light reflected from the navigation surface. The local processor 306 is electrically connected to the driver circuit 302 to provide control signals to the driver circuit to direct the driver circuit to apply driving signals to the light sources 206A and 206B to activate the light sources. The local processor 306 is also electrically connected to the image sensor array 304 via supporting circuitry to provide control signals to control the accumulation of electrical signals or charges at the photosensitive pixel elements of the image sensor array to produce each frame of image data for correlation. Thus, the local processor 306 is able to control the frame rate of the image sensor array 304.

The local processor 306 may be a general-purpose digital processor such as a microprocessor or microcontroller. In other embodiments, the local processor 306 may be a special-purpose processor such as a digital signal processor. In other embodiments, the local processor 306 may be another type of controller or a field programmable gate array (FPGA).

In an embodiment, the local processor 306 includes a navigation engine 308, which is programmed into the local processor. However, in other embodiments, the navigation engine 308 may be a separate component. The navigation engine 308 can be implemented as software, hardware and/or firmware. The navigation engine 308 operates to correlate the frames of image data captured by the image sensor array 304 to estimate any lateral displacement changes between the optical sensor unit 106A and the navigation surface 216 with respect to X and Y directions, which are parallel to the navigation surface, as indicated in FIG. 1. The process of correlating frames of image data for motion estimation or navigation is well known, and thus, is not described herein. In an embodiment, the output of the navigation engine 308 includes directional delta x displacement values and directional delta y displacement values. Each directional displacement value includes a negative or positive sign information, which indicates direction, and an absolute displacement value, which indicates the amount of displacement in that direction. Thus, the x displacement value indicates displacement change along the X axis, while the y displacement value indicates displacement change along the Y axis. In a particular implementation, the directional delta x and y displacement values are generated in the form of hex numbers.

Figure 4:
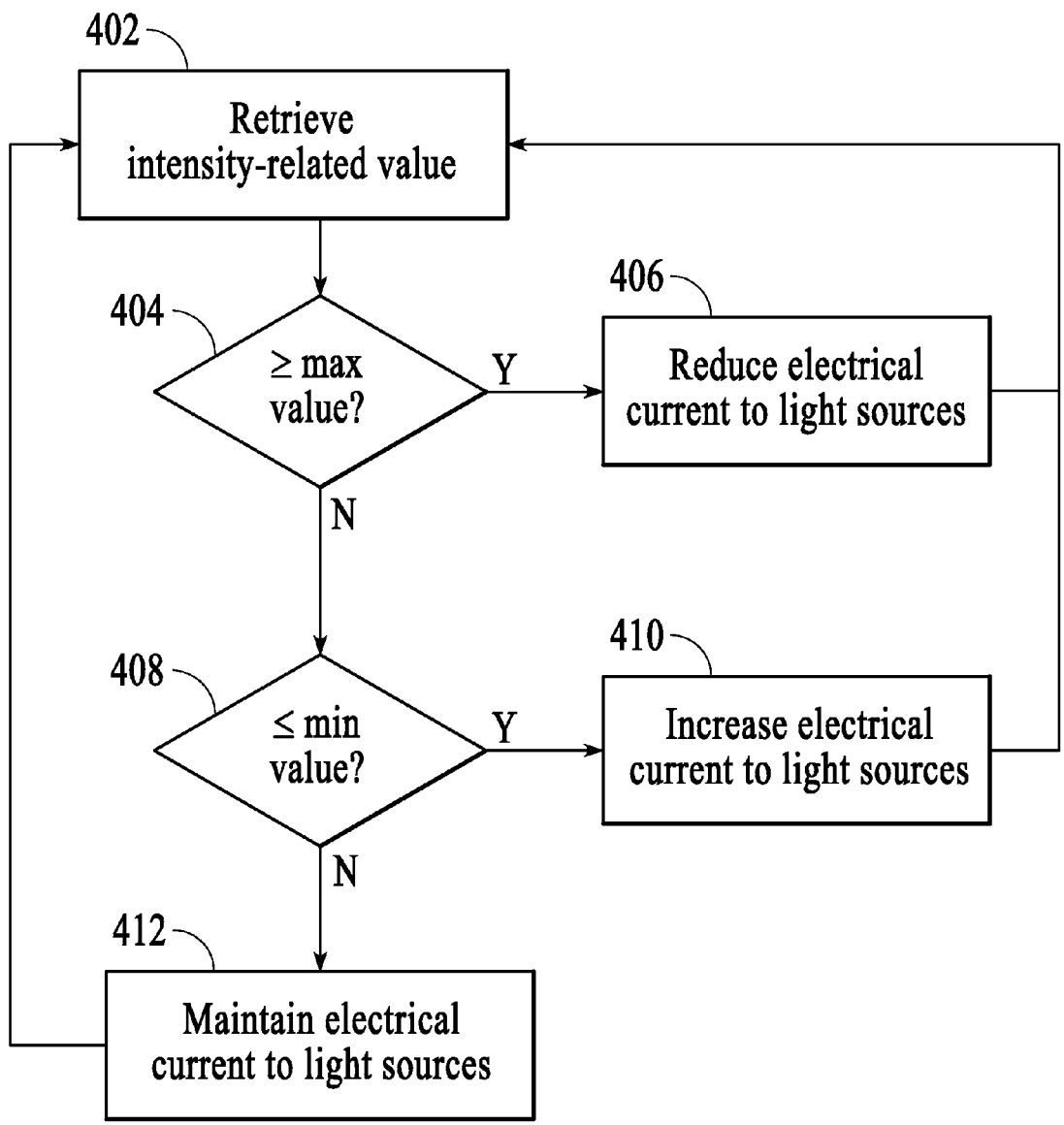
FIG. 4 is a process flow diagram of an intensity adjustment process in accordance with an embodiment of the invention.

In an embodiment, the local processor 308 is configured or programmed to adjust the intensity of the illumination light provided by the light sources 206A and 206B. The intensity adjustment process performed by the local processor 308 is described with reference to a process flow diagram of FIG. 4. At block 402, an intensity-related value is retrieved. In some embodiments, the intensity-related value may be a frame per second (FPS) value or a shutter value. In other embodiments, the intensity-related value may be any value that indicates the intensity of the illumination light from the light sources 206A and 206B.

Next, at block 404, a determination is made whether the intensity-related value is equal to or greater than a predetermined maximum value. If yes, then the process proceeds to block 406, where the electrical current (i.e., the driving signal) to the light sources 206A and 206B is reduced to reduce the intensity of the illumination light generated by the light sources. The process then proceeds back to block 402, where a new intensity-related value is retrieved. However, if the intensity-related value is not equal to or greater than the predetermined maximum value, the process proceeds to block 408.

At block 408, a determination is made whether the intensity-related value is equal to or less than a predetermined minimum value. If yes, then the process proceeds to block 410, where the electrical current (i.e., the driving signal) to the light sources 206A and 206B is increased to increase the intensity of the illumination light generated by the light sources. The process then proceeds back to block 402, where a new intensity-related value is retrieved. However, if the intensity-related value is not equal to or less than the predetermined minimum value, the process proceeds to block 412, where the electrical current (i.e., the driving signal) to the light sources is maintained or unchanged. The process then proceeds back to block 402, where a new intensity-related value is retrieved.

In this manner, the intensity of the illumination light from the light sources 206A and 206B is adjusted to improve tracking under extremely dark or bright conditions.

Although the driver circuit 302, the image sensor array 304 and the local processor 308 are integrated into the navigation sensor 224 in the illustrated embodiment, some or all of these components may be physically separate devices in other embodiments. Also, in other embodiments, some of the components of the navigation sensor 224, such as the navigation engine 308, may be integrated into the processing unit 108. Furthermore, some of the functions of the local processor 308 may be performed by the processing unit 108.

The processing unit 108 is electrically connected to the optical sensor unit 106B or to the optical sensor units 106A and 106C to receive x and y directional displacement values from the optical sensor units. As described below, the processing unit 108 is configured to process the x and y directional displacement values to track the movements of the mobile device 102.

Figure 5:
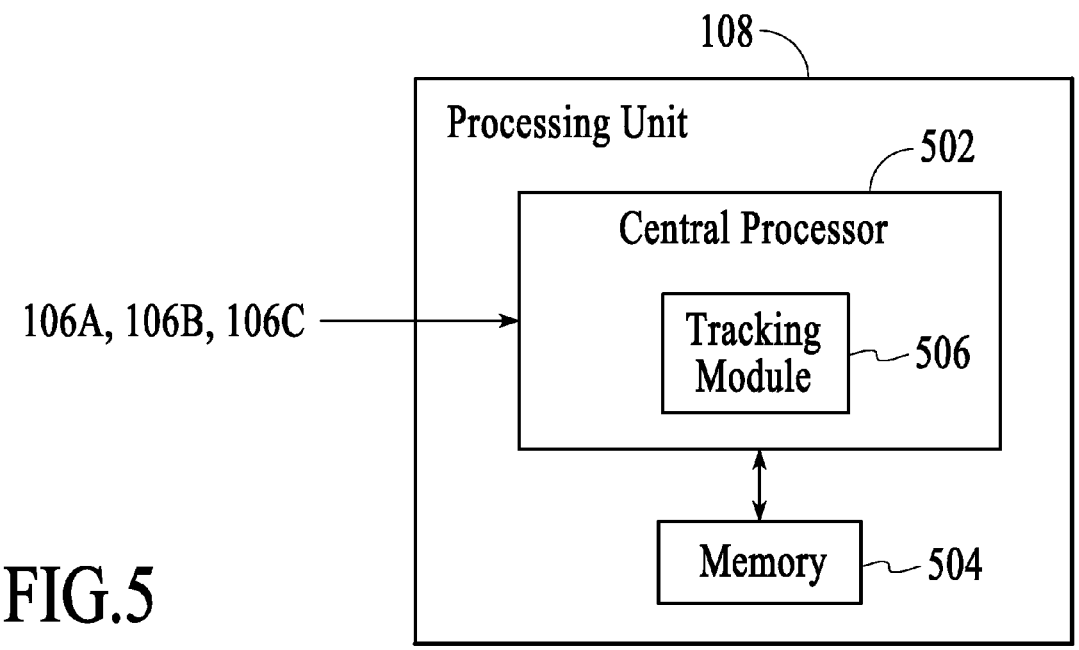
FIG. 5 is a block diagram of a processing unit of the optical tracking system of FIG. 1 in accordance with an embodiment of the invention.

As shown in FIG. 5, the processing unit 108 includes a central processor 502 and memory 504. The central processor 502 may be a general-purpose digital processor such as a microprocessor or microcontroller. In other embodiments, the central processor 502 may be a special-purpose processor such as a digital signal processor. In other embodiments, the central processor 502 may be another type of controller or a FPGA. The memory 504 is used to store data and/or programs for use by the central processor 502.

In the illustrated embodiment, the central processor 502 includes a tracking module 506, which is configured to perform a tracking process using the x and y directional displacement values from the optical sensor unit 106B or from the optical sensor units 106A and 106C. The tracking module 506 performs either a single sensor tracking process, i.e., a tracking process using the optical sensor unit 106B, or a dual sensor tracking process, i.e., a tracking process using the optical sensor units 106A and 106C.

Figure 6:
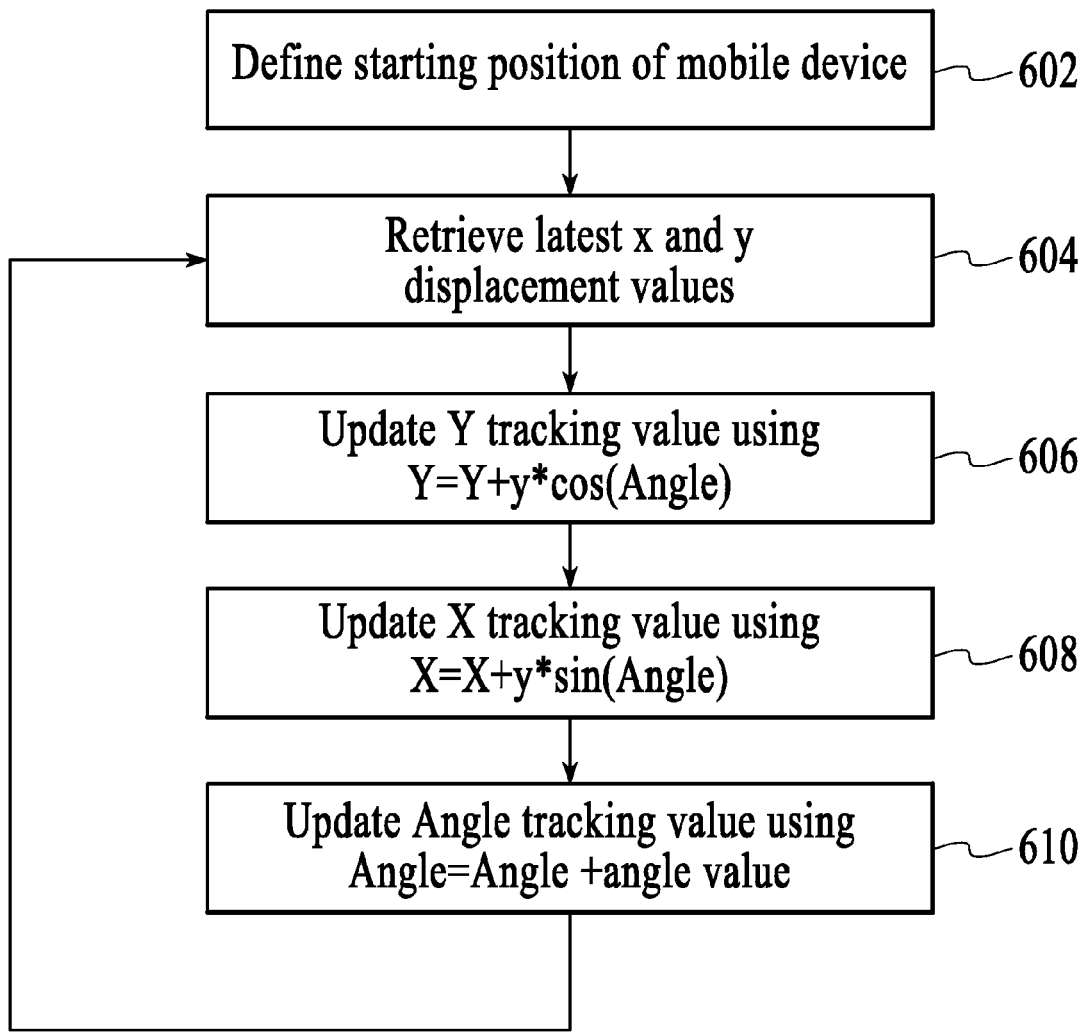
FIG. 6 is a process flow diagram of a single sensor tracking process in accordance with an embodiment of the invention.

A single sensor tracking process performed by the tracking module 506 in accordance with an embodiment of the invention is described with reference to a process flow diagram of FIG. 6. The single sensor tracking process begins at block 602, where the starting position of the mobile device 102 is defined. In particular, tracking values X, Y and Angle are set to zero to define the current position of the mobile device 102 as the starting position. The X value is the tracking value along the X axis. The Y value is the tracking value along the Y axis. The X and Y tracking values indicate the current position of the mobile device 102 from the defined starting position. The Angle value is the current angle of the mobile device 102 with respect to the Y axis. Thus, the Angle value is equal to zero when the mobile device 102 is pointing in the positive direction along the Y axis. Next, at block 604, latest x and y displacement values from the optical sensor unit 106B are retrieved. Next, at block 606, the Y tracking value is updated by computing the updated Y tracking value using the equation: $Y=Y+y*\cos(Angle)$, where y is the latest y displacement value. Next, at block 608, the X tracking value is updated by computing the updated X tracking value using the equation: $X=X+y*\sin(Angle)$. Next, at block 610, the Angle tracking value is updated by computing the updated Angle value using the equation: $Angle=Angle+angle$ value, where the angle value is derived using the latest x and y displacement values, e.g., using $\arctan(y/x)$, where x is the latest x displacement value and y is the latest y displacement value. The updated X and Y tracking values define the current position of the mobile device 102.

The process then proceeds back to block 604, where the latest x and y displacement values from the optical sensor unit are retrieved to update the X, Y and Angle values. In this fashion, the movement of the mobile device 102 is tracked by the tracking module 506.

The tracking module 506 may also monitor the x and y displacement values to check for side slippage of the mobile device 102. If the x displacement value is greater than the y displacement value, then it can be determined that a side slippage of the mobile device 102 has occurred. This information can be used for purposes other than tracking, for example, to determine how well the tires of the mobile device 102 perform during sharp cornering.

Figure 7:
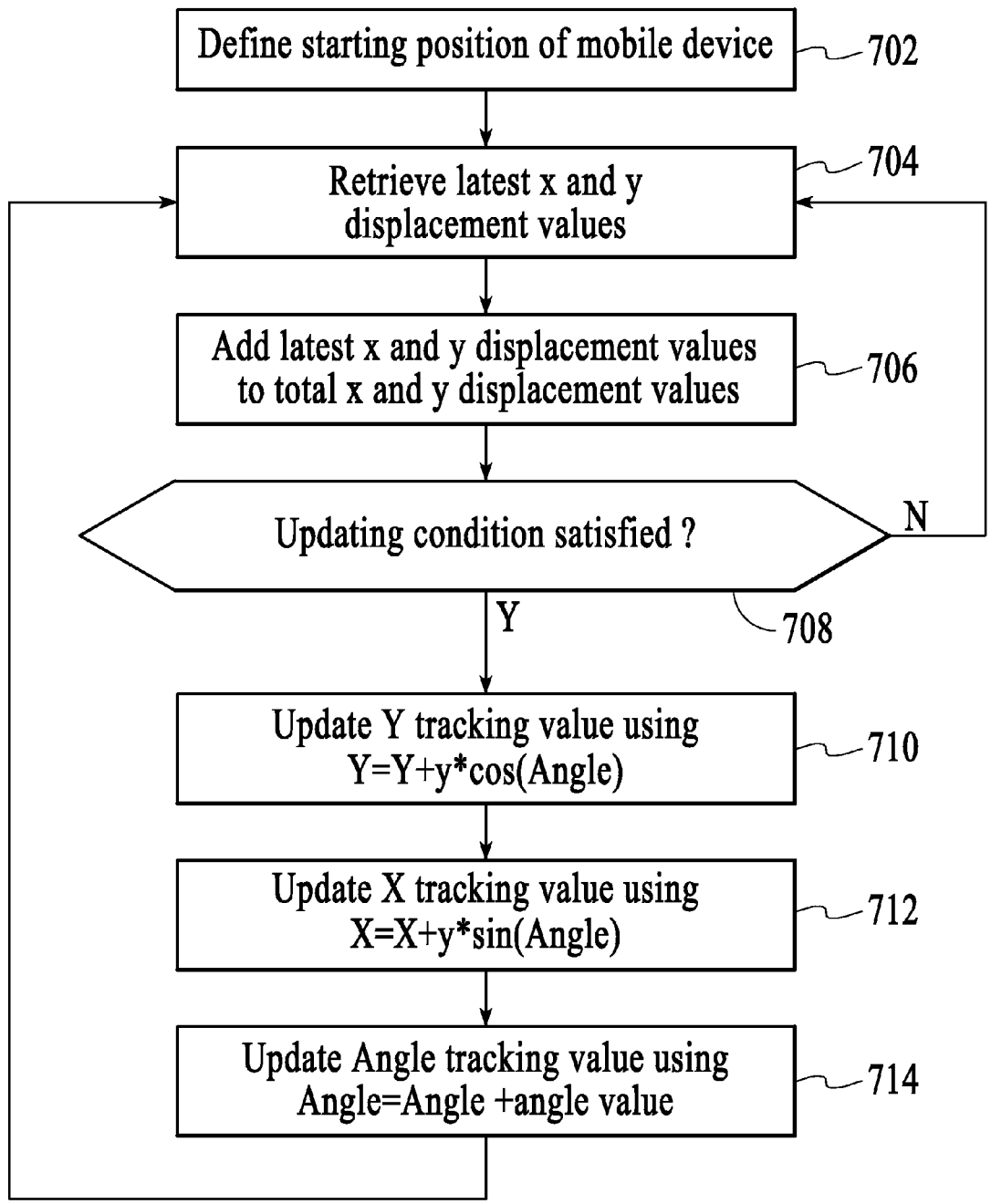
FIG. 7 is a process flow diagram of a modified single sensor tracking process in accordance with an embodiment of the invention.

The above-described tracking process may include tracking errors due to pixel resolution errors, which are magnified by the high rate of speed in which X and Y tracking values are updated using each pair of x and y displacement values from the optical sensor unit 106B, especially when the mobile device 102 is moving very slowly. In particular, the calculated angle value from the x and y displacement values may include a large error, e.g., +/−5 degrees, due to pixel resolution errors in the frames of image data used to derive the x and y displacement values. In order to reduce this error, the single sensor tracking process may be modified so that the rate at which the X, Y and Angle values are updated is reduced. A modified single sensor tracking process performed by the tracking module 506 in accordance with an embodiment of the invention is described with reference to a process flow diagram of FIG. 7.

The modified single sensor tracking process begins at block 702, where the starting position of the mobile device 102 is defined. In particular, the tracking values X, Y and Angle are set to zero to define the current position of the mobile device 102 as the starting position. Next, at block 704, latest x and y displacement values from the optical sensor unit 106B are retrieved. Next, at block 706, the latest x and y displacement values are added to total x and y displacement values, which are summed values of the x and y displacement values. Next, at block 708, a determination is made whether an updating condition is satisfied. In an embodiment, the updating condition is satisfied when a predefined time has passed. Thus, in this embodiment, the updating condition is a time-based condition. In another embodiment, the updating condition is satisfied when the number of retrieved x and y displacement values is equal to a threshold value. As an example, the updating condition may be satisfied when the count of x and/or y displacement values reaches a predefined number, such as 100. If the updating condition is satisfied, the process proceeds to block 710. Otherwise, the process proceeds back to block 704.

At block 710, the Y tracking value is updated by computing the updated Y tracking value using the equation: $Y=Y+y*\cos(\text{Angle})$, where y is the total or summed y displacement value. Next, at block 712, the X tracking values is updated by computing the updated X tracking value using the equation: $X=X+y*\sin(\text{Angle})$. Next, at block 714, the Angle tracking value is updated by computing the updated Angle value using the equation: Angle=Angle+angle value, where the angle value is derived using the total or summed x and y displacement values, e.g., using $\arctan(y/x)$, where x is the summed x displacement value and y is the summed y displacement value. The updated X and Y tracking values define the current position of the mobile device 102.

The process then proceeds back to block 704, where the latest x and y displacement values from the optical sensor unit 106B are retrieved to update the X, Y and Angle values. In this fashion, the movement of the mobile device 102 is tracked by the tracking module 506, while reducing tracking errors due to pixel resolution errors.

Figure 8:
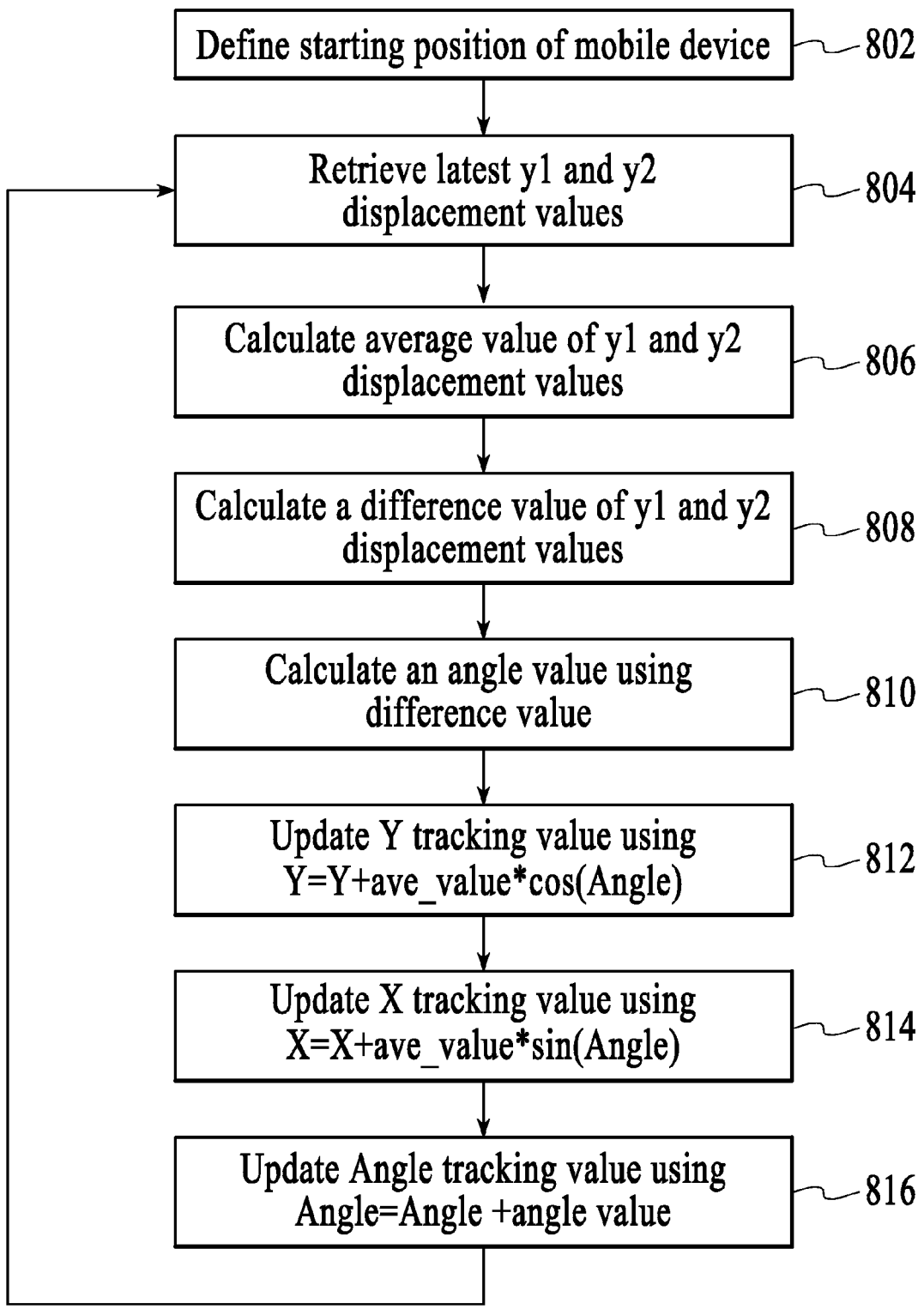
FIG. 8 is a process flow diagram of a dual sensor tracking process in accordance with an embodiment of the invention.

A dual sensor tracking process performed by the tracking module 506 in accordance with an embodiment of the invention is described with reference to a process flow diagram of FIG. 8. In the dual sensor tracking process, only the y displacement values are used to track the movements of the mobile device 102. The x displacement values can be used to track side slippage of the mobile device 102. The dual sensor tracking process begins at block 802, where the starting position of the mobile device 102 is defined. In particular, the X, Y and Angle tracking values are set to zero to define the current position of the mobile device 102 as the starting position. Next, at block 804, latest y1 and y2 displacement values from the optical sensor units 106A and 106B are retrieved.

As used herein, the y1 and y2 displacement values are the y displacement values from the optical sensor units 106A and 106B, respectively. Next, at block 806, an average value of the y1 and y2 displacement values is calculated. Next, at block 808, a difference value of the y1 and y2 displacement values is calculated. Next, at block 810, an angle value is calculated using the difference value. As an example, the angle value can be calculated using the following equation: angle value=arc (1/delta), where delta is the difference value of the y1 and y2 displacement values.

Next, at block 812, the Y tracking value is updated by computing the updated Y tracking value using the equation: $Y=Y+\text{ave\_value}*\cos(\text{Angle})$, where ave\_value is the average value of the y1 and y2 displacement values. Next, at block 814, the X tracking value is updated by computing the updated X tracking value using the equation: $X=X+\text{ave\_value}*\sin(\text{Angle})$. Next, at block 816, the Angle tracking value is updated by computing the updated Angle tracking value using the equation: Angle=Angle+angle value. The updated X and Y tracking values define the current position of the mobile device 102.

The process then proceeds back to block 804, where the latest y1 and y2 displacement values from the optical sensor units 106A and 106C are retrieved to update the X, Y and Angle tracking values. In this fashion, the movement of the mobile device 102 is tracked by the tracking module 506 using both of the optical sensor units 106A and 106C.

Figure 9:
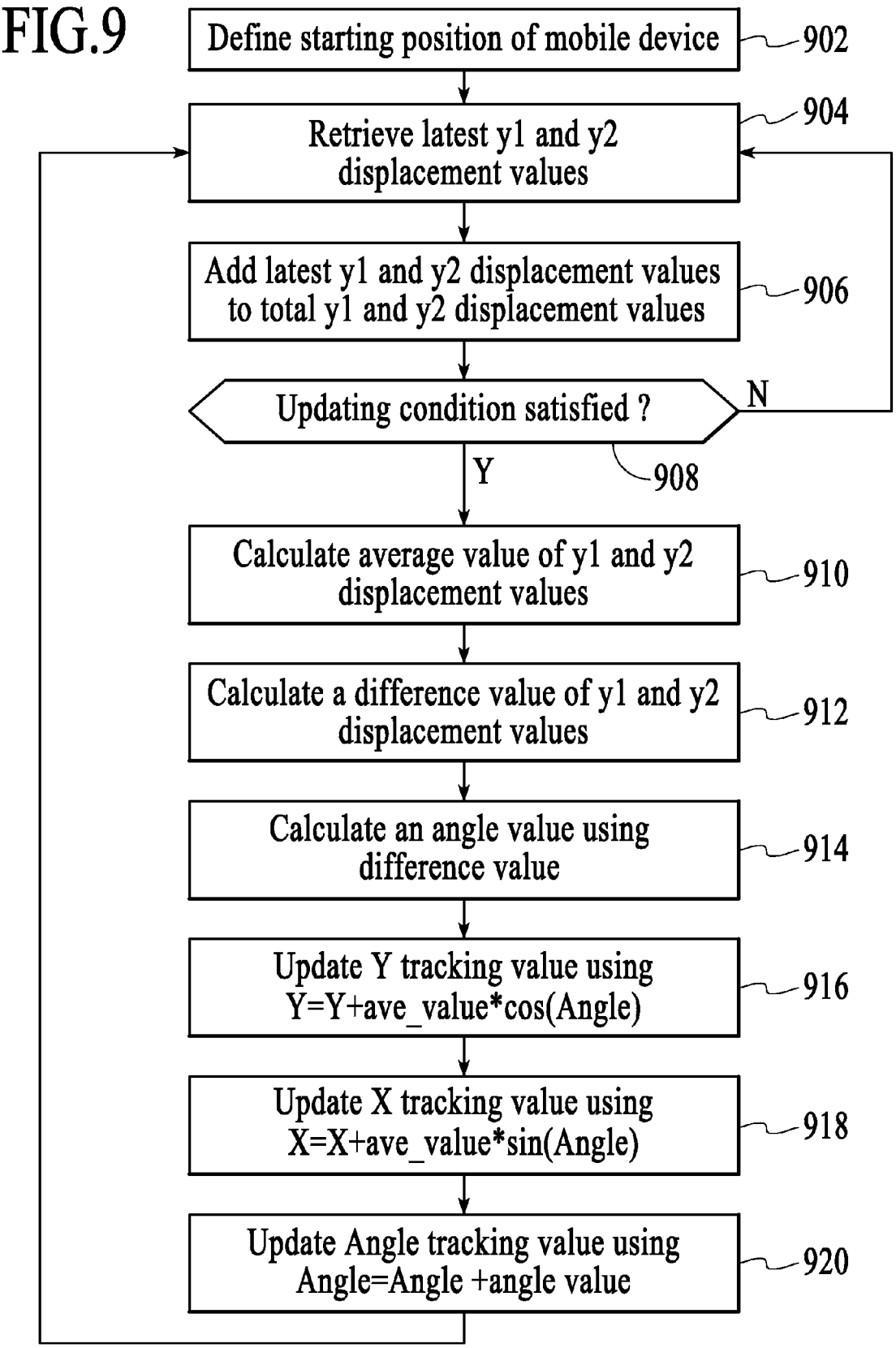
FIG. 9 is a process flow diagram of a modified dual sensor tracking process in accordance with an embodiment of the invention.

The dual sensor tracking process may also be modified to reduce tracking errors due to pixel resolution errors. A modified dual sensor tracking process performed by the tracking module 506 in accordance with an embodiment of the invention is described with reference to a process flow diagram of FIG. 9. The modified dual sensor tracking process begins at block 902, where the starting position of the mobile device 102 is defined. In particular, the X, Y and Angle tracking values are set to zero to define the current position of the mobile device 102 as the starting position. Next, at block 904, latest y1 and y2 displacement values from the optical sensor units 106A and 106C are retrieved.

Next, at block 906, the latest y1 and y2 displacement values are added to total y1 and y2 displacement values, which are initially set to zero. Next, at block 908, a determination is made whether an updating condition is satisfied.

In an embodiment, the updating condition is satisfied when a predefined time has passed. Thus, in this embodiment, the updating condition is a time-based condition. In another embodiment, the updating condition is satisfied when the number of retrieved y1 and y2 displacement values is equal to a threshold value. As an example, the updating condition may be satisfied when the count of y1 and/or y2 displacement values reaches a predefined number, such as 100. If the updating condition is satisfied, the process proceeds to block 910. Otherwise, the process proceeds back to block 904.

Next, at block 910, an average value of the total y1 and y2 displacement values is calculated. Next, at block 912, a difference value of the total y1 and y2 displacement values is calculated. Next, at block 914, an angle value is calculated using the difference value. As an example, the angle value can be calculated using the following equation: angle value=arc (1/delta), where delta is the difference value of the total y1 and y2 displacement values.

Next, at block 916, the Y tracking value is updated by computing the updated Y tracking value using the equation: $Y=Y+\text{ave\_value}*\cos(\text{Angle})$. Next, at block 918, the X tracking value is updated by computing the updated X tracking value X using the equation: $X=X+\text{ave\_value}*\sin(\text{Angle})$. Next, at block 920, the Angle tracking value is updated by computing the updated Angle tracking value using the equation: using Angle=Angle+angle value. The updated X and Y tracking values define the current position of the mobile device 102.

The process then proceeds back to block 904, where the latest y1 and y2 displacement values from the optical sensor units 106A and 106C are retrieved to update the X, Y and Angle values. In this fashion, the movement of the mobile device 102 is tracked by the tracking module 506, while reducing tracking errors due to pixel resolution errors.

Due to inherent tracking inaccuracy for optical sensor units 106A, 106B and 106C in different types of surfaces, there may be a need to calibrate the optical tracking system 100 to get a factorization value based on the expected navigation surfaces on which the system will operate. Thus, the factorization value can be empirically derived by testing the system on various navigation surfaces. As an example, a factorization value of 0.2904494 for each pixel movement has been determined to reduce tracking errors on various navigation surfaces that are commonly found inside of a household.

Figure 10:
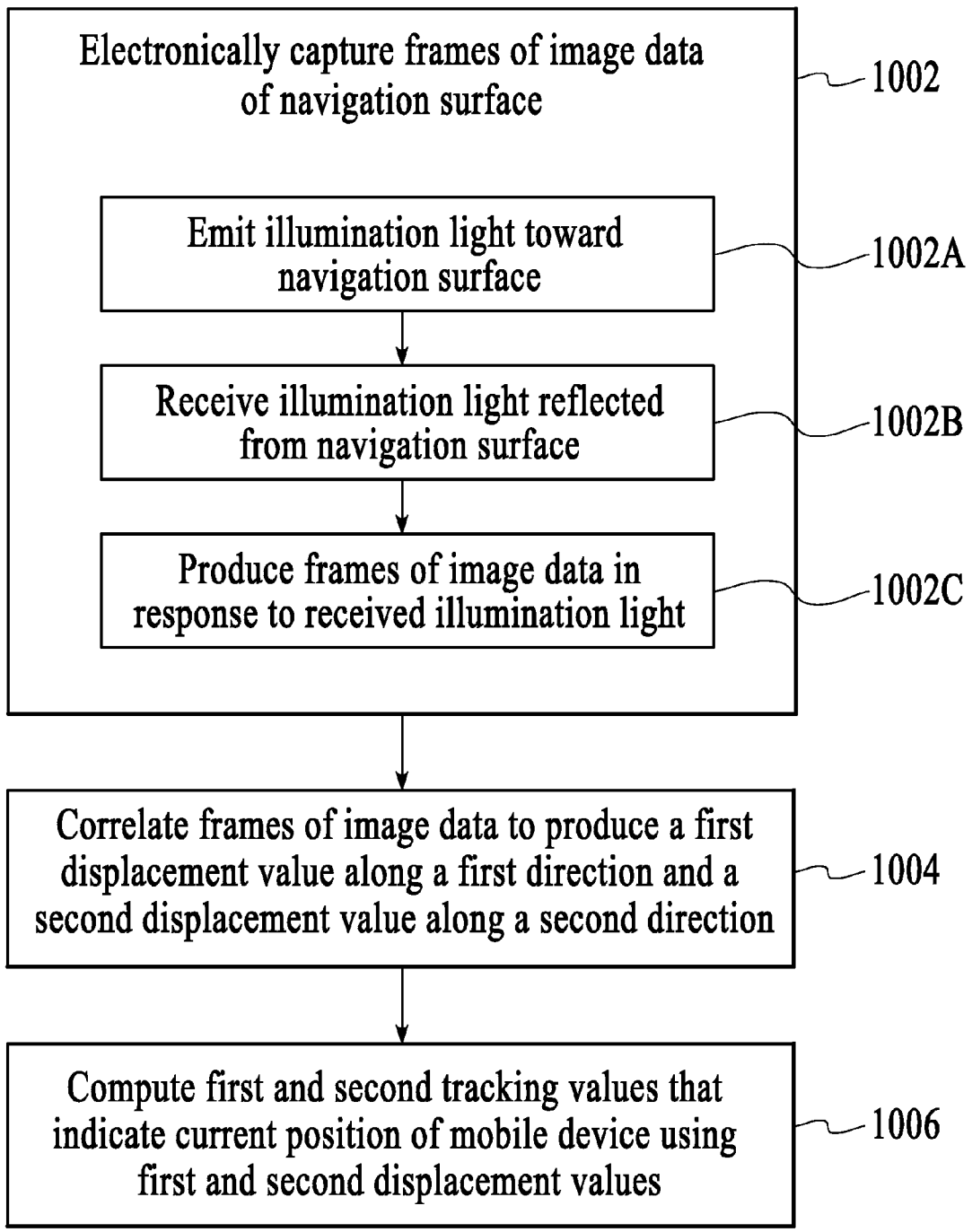
FIG. 10 is a process flow diagram of a method for optically tracking a mobile device in accordance with an embodiment of the invention.

A method for optically tracking a mobile device, such as a mobile device 102, in accordance with an embodiment of the invention is described with reference to a process flow diagram of FIG. 10. At block 1002, frames of image data of a navigation surface are electronically captured. As illustrated in FIG. 10, in an embodiment, the electronic capturing of the frame of image data involves emitting illumination light toward the navigation surface at sub-block 1002A, receiving the illumination light reflected from the navigation surface at sub-block 1002B, and producing frames of image data in response to the received illumination light at sub-block 1002C. Next, at block 1004, the frames of image data are correlated to produce a first displacement value along a first direction and a second displacement value along a second direction. Next, at block 1006, first and second tracking values that indicate the current position of the mobile device are computed using the first and second displacement values. The first tracking value is computed using the second displacement value and the cosine of a tracking angle value. The second tracking value is computed using the second displacement value and the sine of the tracking angle value. The tracking angle value is an angle value derived using at least one previous second displacement value.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system for optically tracking a mobile device comprising:
   a light source configured to emit illumination light toward a navigation surface;
   an image sensor array positioned to receive the illumination light reflected from the navigation surface, the image sensor array being configured to generate frames of image data in response to the received illumination light;
   a navigation engine operably connected to the image sensor array to receive the frames of image data, the navigation engine being configured to correlate the frames of image data to produce a first displacement value along a first direction and a second displacement value along a second direction; and
   a tracking module operably connected to the navigation engine to receive the first and second displacement values to compute first and second tracking values that indicate the current position of the mobile device, the tracking module being configured to compute the first tracking value using the second displacement value and the sine of a tracking angle value and to compute the second tracking value using the second displacement value and the cosine of the tracking angle value, the tracking angle value being an angle value derived using at least one previous second displacement value.

2. The system of claim 1 further comprising a second light source configured to emit another illumination light toward the navigation surface at a different angle than the angle of the illumination light.

3. The system of claim 1 wherein the tracking module is configured to compute the first tracking value using the second displacement value multiplied by the sine of the tracking angle value and to compute the second tracking value using the second displacement value multiplied by the cosine of the tracking angle value, the tracking module being configured to compute the tracking angle value using the first and second displacement values.

4. The system of claim 1 wherein the tracking module is configured to compute the first and second tracking values using a summed second value of multiple second displacement values from the navigation engine and to update the tracking angle value using the summed second value and a summed first value of multiple first displacement values from the navigation engine.

5. The system of claim 4 wherein the tracking module is configured to compute the first tracking value using the summed second value multiplied by the sine of the tracking angle value and to compute the second tracking value using the summed second value multiplied by the cosine of the tracking angle value.

6. The system of claim 1 further comprising a second image sensor array and a second navigation engine that are configured to generate another first and second displacement values, wherein the tracking module is configured to compute the first and second tracking values using an average value derived from the second displacement value and the another second displacement value, the tracking module being also configured to update the tracking angle value using the average value.

7. The system of claim 6 wherein the tracking module is configured to compute the first tracking value using the average value multiplied by the sine of the tracking angle value and to compute the second tracking value using the average value multiplied by the cosine of the tracking angle value, the average value being the average of the second displacement value and the another second displacement value.

8. The system of claim 6 wherein the tracking module is configured to compute the first tracking value using the average value multiplied by the sine of the tracking angle value and to compute the second tracking value using the average value multiplied by the cosine of the tracking angle value, the average value being the average of a summed second value and a summed another second value, the summed second value being the sum of multiple second displacement values from the navigation engine, the summed another second value being the sum of multiple another second displacement values from the second navigation engine.

9. A method for optically tracking a mobile device, the method comprising:
   emitting illumination light toward a navigation surface;
   electronically capturing frames of image data of a navigation surface;
   correlating the frames of image data to produce a first displacement value along a first direction and a second displacement value along a second direction;
   and computing first and second tracking values that indicate the current position of the mobile device using the first and second displacement values, the first tracking value being computed using the second displacement value and the sine of a tracking angle value, the second tracking value being computed using the second displacement value and the cosine of the tracking angle value, the tracking angle value being an angle value derived using at least one previous second displacement value.

10. The method of claim 9 wherein the electronically capturing the frame of image data includes emitting another illumination light toward the navigation surface at a different angle than the angle of the illumination light.

11. The method of claim 9 wherein the computing the first and second tracking values includes:
   computing the first tracking value using the second displacement value multiplied by the sine of the tracking angle value;

computing the second tracking value using the second displacement value multiplied by the cosine of the tracking angle value; and updating the tracking angle value using the first and second displacement values.

12. The method of claim 9 wherein the computing the first and second tracking values includes:

computing the first and second tracking values using a summed second value of multiple second displacement values; and updating the tracking angle value using the summed second value and a summed first value of multiple first displacement values.

13. The method of claim 12 wherein the computing the first and second tracking values includes:

computing the first tracking value using the summed second value multiplied by the sine of the tracking angle value; and computing the second tracking value using the summed second value multiplied by the cosine of the tracking angle value.

14. The method of claim 9 further comprising:

electronically capturing additional frames of image data of the navigations surface; and correlating the additional frames of image data to produce another first displacement value along the first direction and another second displacement value along the second direction, wherein the computing the first and second tracking values includes computing the first and second tracking values using an average value derived from the second displacement value and the another second displacement value.

15. The method of claim 14 wherein the computing the first and second tracking values includes:

computing the first tracking value using the average value multiplied by the sine of the tracking angle value; and computing the second tracking value using the average value multiplied by the cosine of the tracking angle value, wherein the average value is the average of the second displacement value and the another second displacement value.

16. The method of claim 14 wherein the computing the first and second tracking values includes:

computing the first tracking value using the average value multiplied by the sine of the tracking angle value; and computing the second tracking value using the average value multiplied by the cosine of the tracking angle value, wherein the average value is the average of a summed second value and a summed another second value, the summed second value being the sum of multiple second displacement values, the summed another second value being the sum of multiple another second displacement values.

17. The method of claim 9 further comprising monitoring an intensity value associated with one of more of the frames of image data to adjust the intensity of illumination light used to electronically capture the frame of image data.

18. A method for optically tracking a mobile device, the method comprising:

emitting illumination light toward a navigation surface;

receiving the illumination light reflected from the navigation surface;

producing frames of image data in response to the received illumination light;

correlating the frames of image data to produce a first displacement value along a first direction and a second displacement value along a second direction; and computing first and second tracking values that indicate the current position of the mobile device using the first and second displacement values, the first tracking value being computed using the second displacement value and the sine of a tracking angle value, the second tracking value being computed using the second displacement value and the cosine of the tracking angle value, the tracking angle value being an angle value derived using at least one previous second displacement value.

19. The method of claim 18 wherein the computing the first and second tracking values includes:

computing the first tracking value using a selected value multiplied by the sine of the tracking angle value, the selected value being the second displacement value or the sum of the second displacement value and one or more previous second displacement values; and computing the second tracking value using the selected value multiplied by the cosine of the tracking angle value.

20. The method of claim 18 further comprising:

producing additional frames of image data in response additional illumination light reflected from the navigation surface; and correlating the additional frames of image data to produce another first displacement value along the first direction and another second displacement value along the second direction, wherein the computing the first and second tracking values includes:

computing the first tracking value using a selected value multiplied by the sine of the tracking angle value, the selected value being an average value of the second displacement value and the another second displacement value or a summed second displacement value and a summed another second displacement value, the summed second displacement value being the sum of multiple second displacement values, the summed another second displacement value being the sum of multiple another second displacement values; and computing the second tracking value using the selected value multiplied by the cosine of the tracking angle value.

* * * * *